(12) United States Patent
Juranek

(10) Patent No.: US 10,086,452 B1
(45) Date of Patent: Oct. 2, 2018

(54) LATERALLY CUTTING SAW BLADE ASSEMBLY

(76) Inventor: Thomas L. Juranek, Harrisburg, SD (US)

( * ) Notice: Subject to any disclaimer, the term of this patent is extended or adjusted under 35 U.S.C. 154(b) by 809 days.

(21) Appl. No.: 13/030,106

(22) Filed: Feb. 17, 2011

Related U.S. Application Data

(63) Continuation-in-part of application No. 12/963,269, filed on Dec. 8, 2010, now Pat. No. 8,480,339.

(51) Int. Cl.
*B23D 61/02* (2006.01)

(52) U.S. Cl.
CPC .......... *B23D 61/021* (2013.01); *B23D 61/02* (2013.01); *Y10T 83/935* (2015.04); *Y10T 83/9319* (2015.04)

(58) Field of Classification Search
CPC ...... B23D 61/04; B23D 61/02; B23D 61/021; B23D 61/023; B23D 61/025; Y10T 83/935; Y10T 83/9319
USPC .................................................. 83/835–855
See application file for complete search history.

(56) References Cited

U.S. PATENT DOCUMENTS

| | | | |
|---|---|---|---|
| 2,476,749 A * | 7/1949 | Marsh | 407/60 |
| 3,362,446 A * | 1/1968 | Potomak | 83/855 |
| 4,079,648 A | 3/1978 | Chappell | |
| 4,173,914 A * | 11/1979 | Vollmer et al. | 83/848 |
| 4,259,887 A * | 4/1981 | Dean | B27B 25/10 144/253.1 |
| 4,640,172 A * | 2/1987 | Kullmann et al. | 83/835 |
| 4,763,703 A | 8/1988 | Fromm | |
| 4,784,033 A * | 11/1988 | Hayden et al. | 83/661 |
| 4,909,111 A | 3/1990 | Noble | |
| 5,090,283 A | 2/1992 | Noble | |
| 6,035,844 A * | 3/2000 | Otani et al. | 125/15 |
| 6,073,532 A * | 6/2000 | English | 83/875 |
| 6,276,249 B1 * | 8/2001 | Handschuh et al. | 83/851 |
| 6,854,372 B2 | 2/2005 | Anthony | |
| 6,877,238 B2 | 4/2005 | Kanaga | |
| 7,111,537 B2 | 9/2006 | Vallone | |
| 7,159,498 B2 | 1/2007 | Stewart | |
| 2002/0170410 A1 * | 11/2002 | Gittel et al. | 83/835 |
| 2003/0221531 A1 | 12/2003 | Anthony | |
| 2003/0221534 A1 * | 12/2003 | Lowder et al. | 83/676 |
| 2005/0109181 A1 | 5/2005 | Zawadzki | |
| 2010/0126326 A1 * | 5/2010 | Cloutier | 83/835 |

OTHER PUBLICATIONS www.justsaw.com/incatpg03a.gif ; Mar. 5, 2007, p. 1.*

* cited by examiner

*Primary Examiner* — Laura M Lee

(57) ABSTRACT

A laterally cutting saw blade assembly includes a plate that has a pair of opposed faces, a center and a peripheral edge having a plurality of shoulders attached thereto. Each of the shoulders has a pair of opposed faces. The shoulders each have a distal edge with respect to the peripheral edge. The distal edge of each of the shoulders extends between a tailing edge and a leading edge of each of the shoulders. A plurality of teeth is provided. Each of the leading edges has one of the teeth attached thereto. The teeth extend laterally away from each of the opposed faces. The teeth form a plurality of cutting surfaces extending continuously from the distal edge toward the center a distance equal to at least equal to 1.90 cm. The plate is mounted to a cutting assembly and rotated to cut lateral to the opposed faces.

12 Claims, 16 Drawing Sheets

LATERALLY CUTTING SAW BLADE ASSEMBLY

This is a continuation in part of U.S. patent application Ser. No. 12/963,269 filed on Dec. 8, 2010 now U.S. Pat. No. 8,480,339.

BACKGROUND OF THE DISCLOSURE

Field of the Disclosure

The disclosure relates to wood shaping devices and more particularly pertains to a new wood shaping device particularly well suited for coping the end of trim to allow two pieces of trim, coming together at an angle, to be abutted against each other in a flush manner.

SUMMARY OF THE DISCLOSURE

An embodiment of the disclosure meets the needs presented above by generally comprising a plate that has a pair of opposed faces and a center forming an aperture extending through the plate. The plate has a peripheral edge having a plurality of shoulders attached thereto and extending outwardly therefrom. Each of the shoulders has a pair of opposed faces corresponding with and being continuations of the opposed faces of the plate. The shoulders each have a distal edge with respect to the peripheral edge. The distal edge of each of the shoulders extends between a tailing edge and a leading edge of each of the shoulders. A plurality of teeth is provided. Each of the leading edges has one of the teeth attached thereto. The teeth form a plurality of cutting surfaces extending continuously from the distal edge toward the center a distance equal to at least equal to 1.90 cm. The plate is mounted to a cutting assembly and rotated to allow the teeth to cut lateral to the opposed faces.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
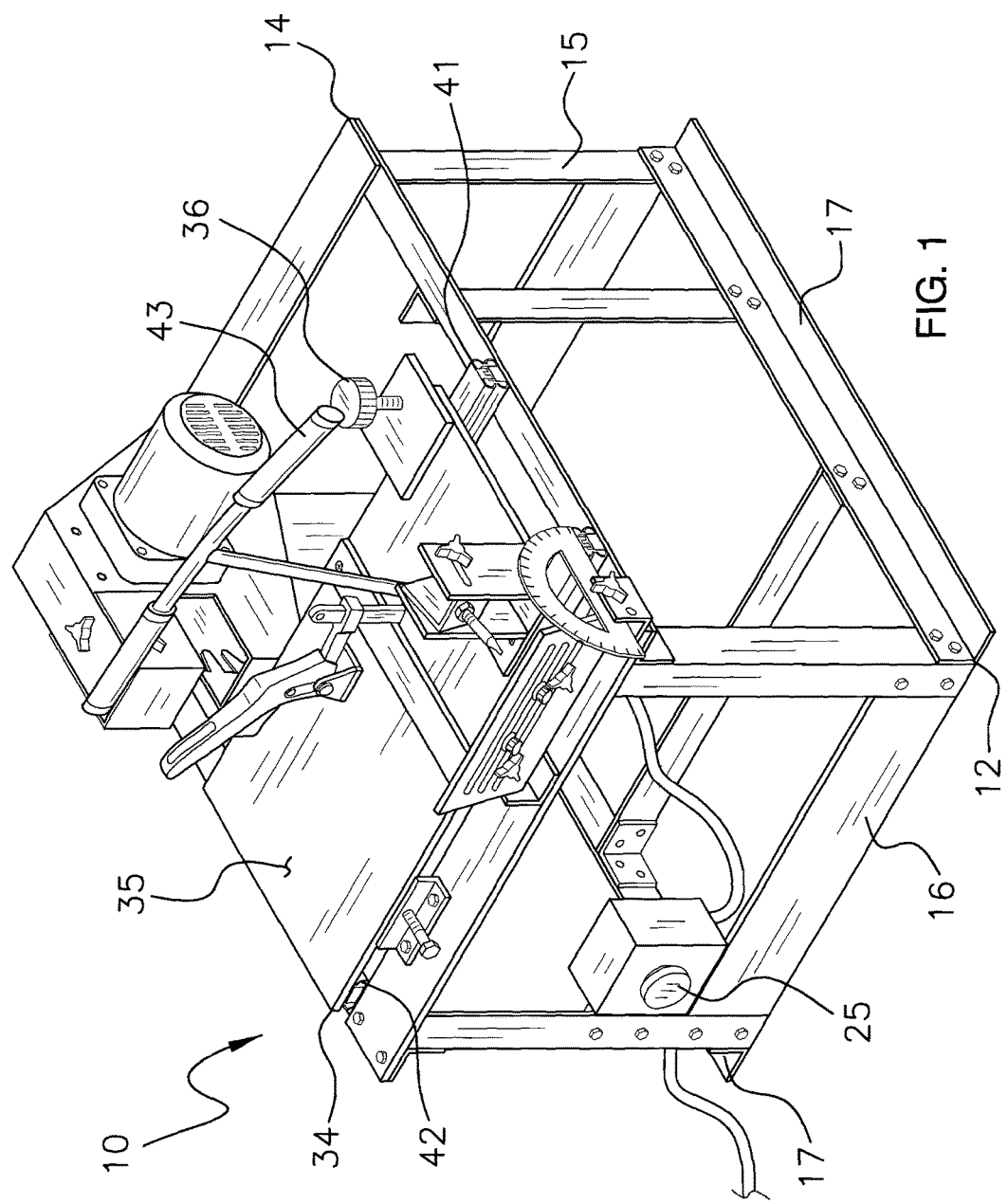
FIG. 1 is a top perspective view of a trim coping apparatus according to an embodiment of the disclosure.
Figure 2:
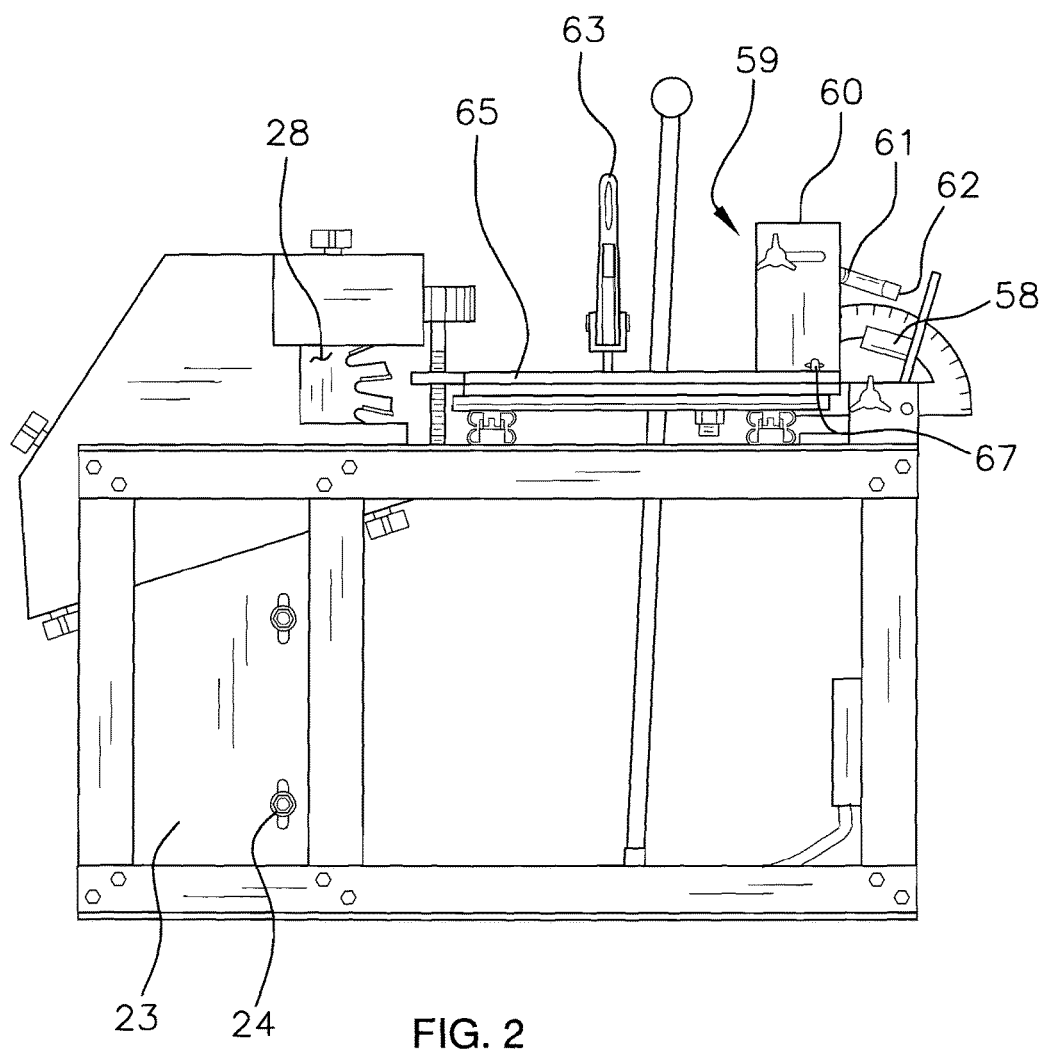
FIG. 2 is a right side view of an embodiment of the disclosure.
Figure 3:
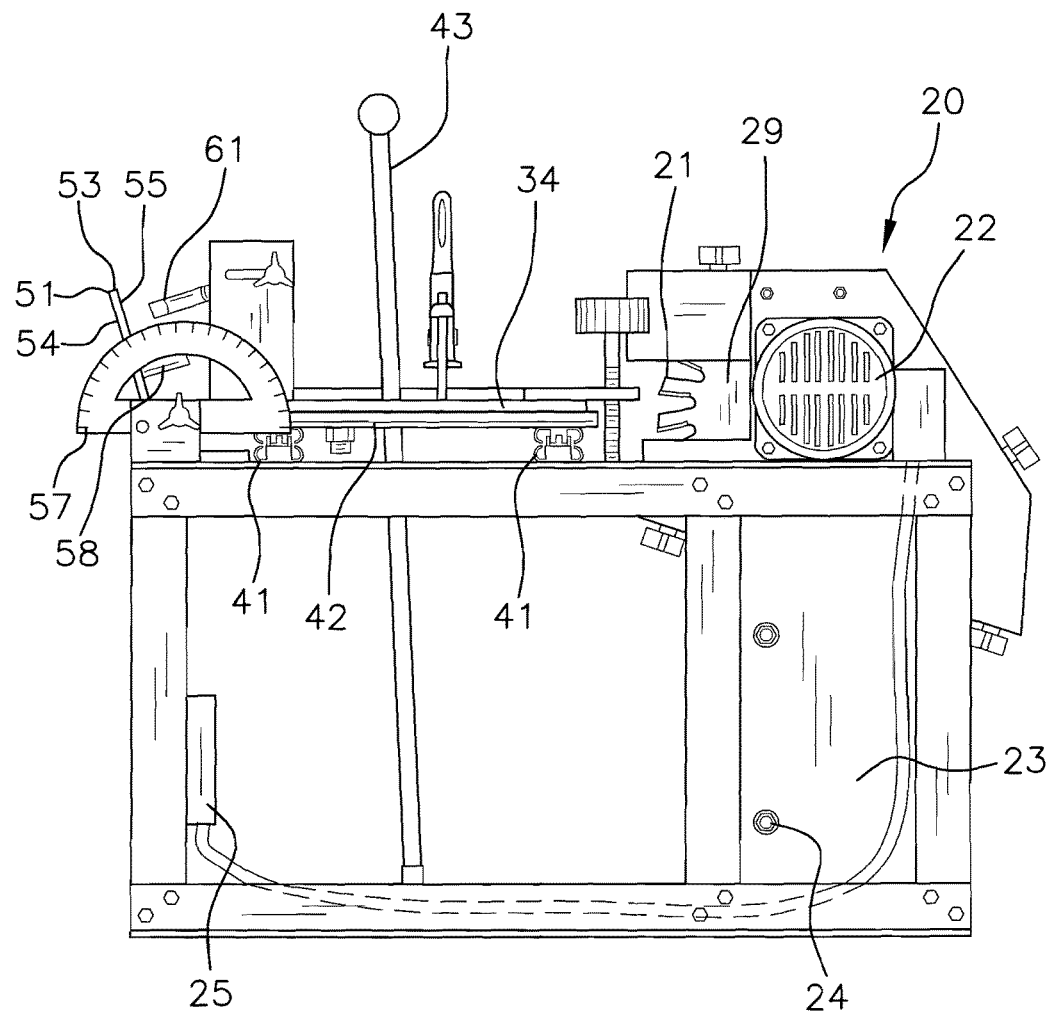
FIG. 3 is a left side view of an embodiment of the disclosure.
Figure 4:
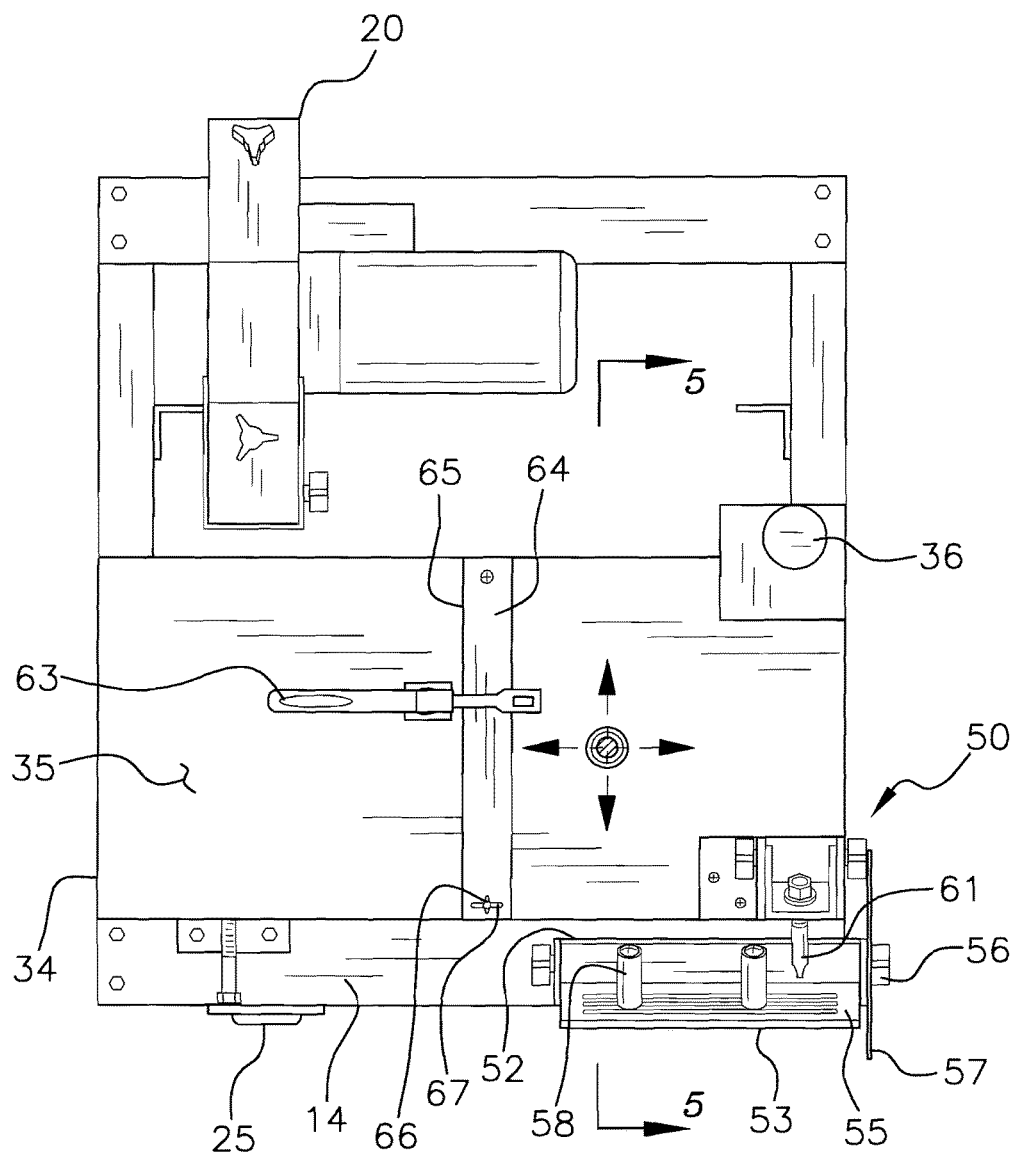
FIG. 4 is a top view of an embodiment of the disclosure.

With reference now to the drawings, and in particular to FIGS. 1 through 20 thereof, a new wood shaping device embodying the principles and concepts of an embodiment of the disclosure and generally designated by the reference numeral 19 will be described.

As best illustrated in FIGS. 1 through 20, the trim coping apparatus 10 and the laterally cutting saw blade assembly 110 generally comprises a support frame 12 that includes an upper support 14 and a plurality of legs 15 that are attached to and extend downwardly from the upper support 14. As can be seen in FIG. 1, the support frame 12 may include bracing members 16 extending between the legs 15 as well as lateral supports 17 for stabilizing the support frame 12. It should be understood that any conventional support structure used for cutting operations may be utilized.

A cutting assembly 20 is provided which includes a saw blade 21 and motor 22 for rotating the saw blade 21. The saw blade 21 is a circular saw blade. The cutting assembly 20 is mounted on the frame 12 and may be configured to be raised or lowered with respect to the upper support 14. This is accomplished by slidably mounting the cutting assembly 20 to support brackets 23 that include fasteners 24 for lifting or lowering the cutting assembly 20 with respect to the support brackets 23. The cutting assembly 20 is electrically powered and generally comprises a conventional electric saw with an actuator 25 electrically coupled to the cutting assembly 20 for selectively turning the cutting assembly 20 on or off.

Figure 10:
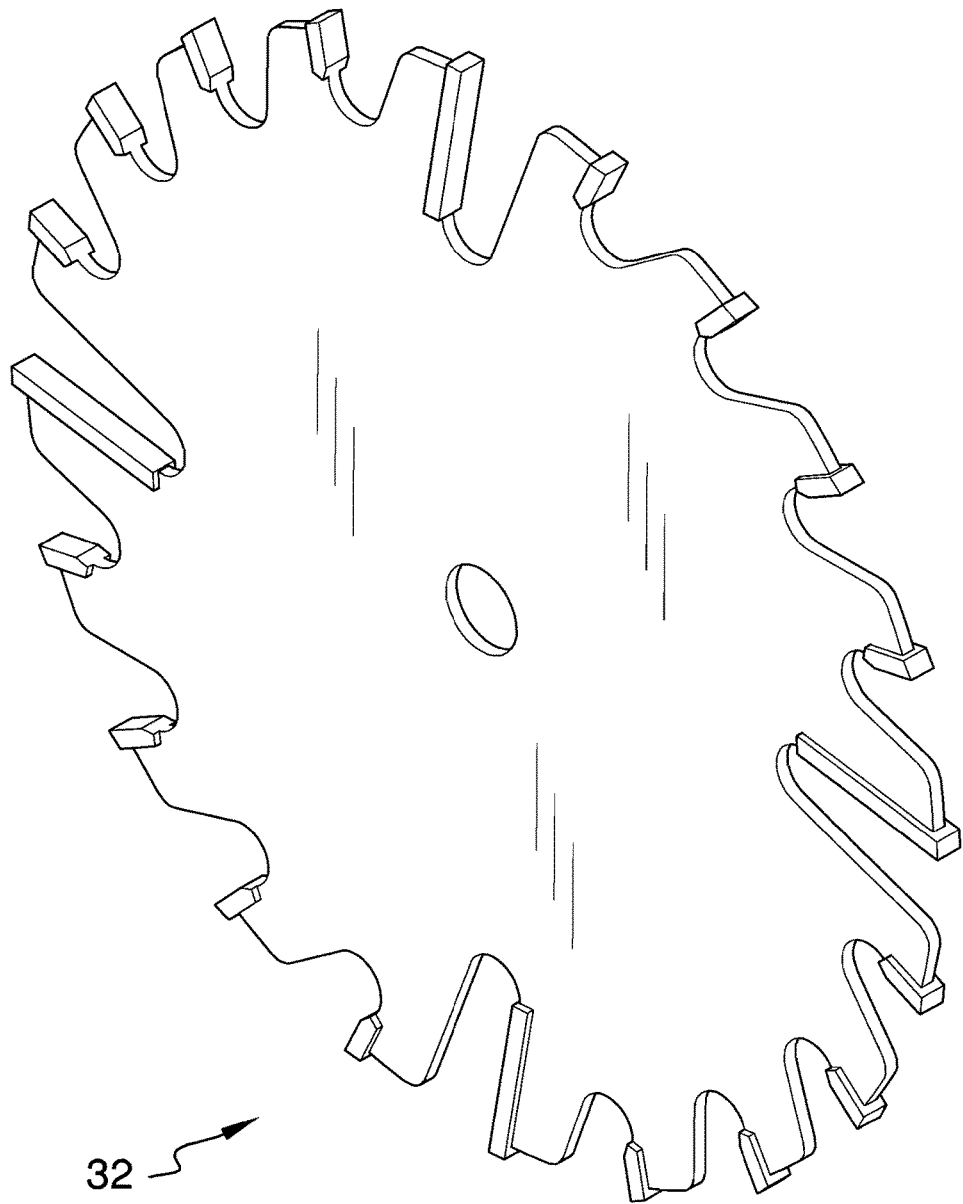
FIG. 10 is a partial perspective view of a saw blade of an embodiment of the disclosure.

While a conventional circular saw blade assembly may be used on some trims, particularly those that have no rounded areas, a modified saw blade 21, shown in FIGS. 6, 7 and 10-19 may be employed. This type of saw blade 21 will include conventional shoulders 26, however this saw blade 21 will include teeth 27 extending outwardly laterally from planes of a pair of opposed faces 28 of the plate of the saw blade 21. As shown in the Figures, the teeth 27 may be positioned on the shoulders 26 and extend not only laterally away but forward outwardly from the shoulders 26 as well. This allows the saw blade 21 to cut in three directions including opposed lateral directions and forward. It should be understood that these teeth 27 may further be mounted on, or through, the opposed faces 28, 29 themselves. The teeth 27, if mounted on the shoulders 26, may have a width that tapers inwardly from an outer end 30 thereof toward a center 31 of the saw blade 21. This will prevent jamming of the teeth 27 if they are used to cut wood in a conventional manner. However, this particular configuration of teeth 27 extending laterally from the saw blade 21 is particularly effective for the current apparatus 10 to allow wall trim to be coped laterally as wall trim 70 is brought laterally into the face 28 or 29 of the saw blade 21. The teeth 27 will typically have a length, starting at an outer end of the teeth 27 and extending along a line generally toward the center 31, greater than 1.25 cm. FIG. 10 provides another modified blade 32 having areas including shoulders 26 of greater lengths. Such a blade 32 would be particularly useful as a framing blade. FIGS. 11-19 will be more fully explained below.

A panel 34 is mounted to the support frame 12. The panel 34 has a planar upper surface 35. The saw blade 21 extends above and below the upper surface 35. The panel 34 and the cutting assembly 20 are movable with respect to each other to allow a portion of the wall trim 70 extending over an edge of the panel 34 to be cut by the saw blade 21. While the saw blade 21 may be tilted with respect to the panel 34, typically the saw blade 21 will have an axis of rotation orientated parallel to a plane of the upper surface 35. A table lock 36 may be mounted on the panel 34 to selectively lock the panel 34 in place. Discussed below is a mounting 40 for allowing movement of the panel 34 in which the cutting assembly 20 is relatively fixed, in comparison to the panel 34. However, it should be understood that this arrangement could be reversed such that the cutting assembly 20 is movable while the panel 34 is relatively fixed.

The mounting 40 couples the panel 34 to the upper support 14. The mounting 40 allows movement of panel 34 toward or away from the cutting assembly 20 to define an x-movement and laterally left or right of the cutting assembly 20 to define a y-movement. The ability to move the panel 34 in both the x and y axes allows the user to control the precise positioning of the wall trim 70 with respect to the saw blade 21. The mounting 40 includes a first rail assembly 41 and a second rail assembly 42 coupled together and positioned between and being attached to the upper support 14 and the panel 34. The first 41 and second 42 rail assemblies are orientated perpendicular to each other. One of the first 41 and second 42 rail assemblies allows the x-movement of the panel 34 and one of the first 41 and second 42 rail assemblies allows the y-movement of the panel. While the first 41 and second 42 rail assemblies could be alternately positioned, the Figures show the first rail assembly 41 being attached to the upper support 14 and the second rail 42 assemblies being attached to the panel 34. The first 41 and second 42 rail assemblies may include two rails as shown in the Figures though any number may be used.

A handle 43 engages the panel 34 to facilitate movement of the panel 34 with respect to the cutting assembly 20. As can be seen in the Figures, the handle 43 may be pivotally mounted to a brace 18 extending under the panel 34 and attached to the frame 12. This allows for more precise and steady movements of the panel 34. The handle 43 will be allowed to pivot 360° with respect to the brace 18. A tensioning bolt 44 or other similar structure may be mounted on the frame 12 or the panel 34 to selectively engage the first 41 or second 42 rail assemblies to prevent the panel 34 from moving too freely with respect to the frame 12.

A control guide 50 is in communication with the panel 34. The control guide 50 is configured to follow contouring 72 on a face of a piece of guide trim 71 to restrict movement of the panel 34 and the cutting assembly 20 with respect to each other to allow the cutting assembly 20 to cope an ending 74 of the piece of wall trim 70. The control guide 50 includes a plate 51 that is attached to the upper support 14. The plate 51 has a lower edge 52, an upper edge 53, a rear face 54 and a front face 55 with the front face 55 facing the panel 34. The front face 55 lies in a plane orientated parallel to the axis of rotation axis of the saw blade 21. The guide trim 71 is positionable on the front face 55 and the contouring 72 of the guide trim 71 is directed toward the panel 34. The plate 51 is pivotal with respect to the panel 34 to allow the upper edge 53 to be moved toward or away from the panel 34. The plate 51 may be locked into place with a locking screw 56. Typically, an angle formed by the upper surface 35 and the front face 55 is greater than 100° and more typically the angle is between approximately 115° and 125°.

An angle guide 57 may be mounted to the upper support 14 to indicate an angle of the front face 55 with respect to a plane of the upper surface 35. The angle guide 57 is not shown in FIG. 5 for clarity purposes. This will ensure repeatability of cuts as well as determining pre-set angles. The ability to angle to the plate 51 will ensure that that the curvature, or radius, of the saw blade 21 will be taken into account. By angling the plate 51 more, the control guide 50 will be moved a greater distance as it follow the contouring 72, which in turn will lead to deeper cuts in the wall trim 70. It has been found that if the plate 51 is not angled, the apparatus 10 will function, however thicker areas of wall trim 70 will not align as well as thinner areas.

Figure 5:
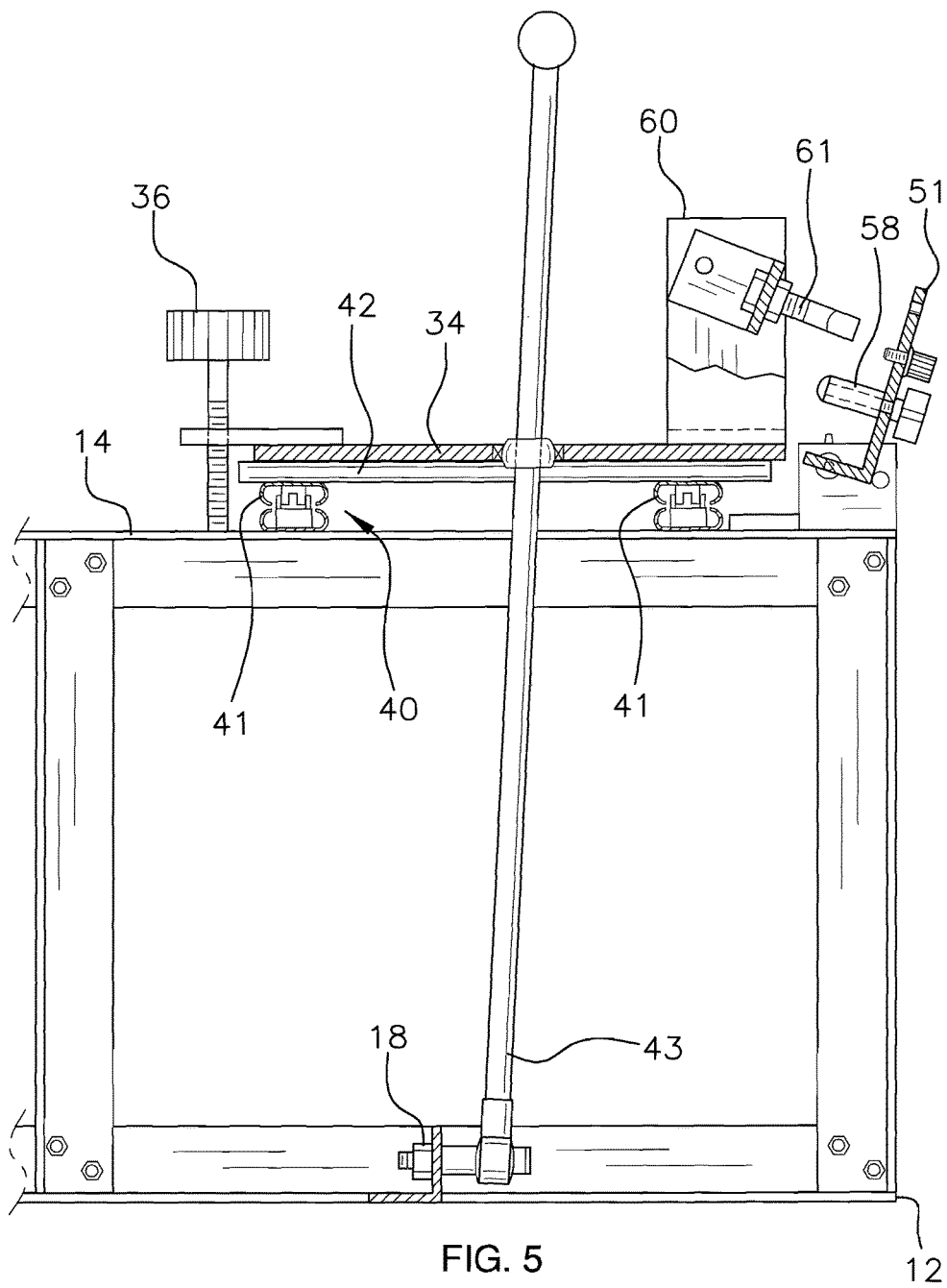
FIG. 5 is a cross-sectional view of an embodiment of the disclosure taken along line 5-5 of FIG. 4.

A stop 58 is mounted on the plate 51 and is abuttable against the guide trim 71 to restrict movement of the guide trim 71. The stop 58 is configured to be movable on the front face 55. As shown in FIG. 5, in particular, a plurality of stops 58 may be used and if needed placed on opposite ends of the guide trim 71. In general, the wall trim 71 will be placed adjacent to the saw blade 21 and then the stop 58 adjusted to position the guide trim 71 to a location where its contouring 72 will begin to be engaged.

The control guide 50 further includes an engagement member 59 that is configured to engage and follow the contouring 72 of the face of the guide trim 71. The engagement member 59 is mounted on the panel 34 and includes a docking member 60 attached to and extending upwardly from the upper surface 35. A rod 61 is attached to the docking member 60 and extends toward the plate 51. The rod 61 has a free end 62 that is configured to be movable across the contouring 72. The rod 61 is movable toward or away from the front face 55 and is also pivotable with respect to the docking member 60 to allow the free end 62 to be vertically lifted or lowered. The rod 61 may be comprised of a low friction material such as metal, plastic or silicone and may have a rounded free end 62.

A clamp 63 is mounted on the panel 34 and the clamp 63 is configured to retain the wall trim 70 in abutment with the upper surface 35 and prevent the wall trim 70 from moving on the upper surface 35 while the wall trim 70 is being coped. The clamp 63 may comprise any conventional clamp that does not interfere with the movement of the panel 34. A trim brace 64 may be mounted to the upper surface 35 as well. The trim brace 64 is configured to restrict movement of the wall trim 70 on the upper surface 35 and in particular to prevent it from pivoting with respect to the upper surface 35. The wall trim 70 is abuttable against the trim brace 64 when the wall trim 70 is clamped to the panel 34 with the clamp 63. The trim brace 64 has an inner edge 65 abuttable against the wall trim 70. The inner edge 65 has a longitudinal axis that is orientated parallel to the upper surface 35. This allows the longitudinal axis of the inner edge 35 and the axis of rotation of the saw blade 21 to lie in planes that are parallel to each other. The trim brace 64 is pivotable to allow the inner edge to be angled between +5° and −5° from being perpendicular with the axis of rotation of the saw blade. The ability to slightly angle the trim brace 64 allows for taking into account dwelling walls 78 which are not true. The trim brace 64 may be pivotable by loosening a bolt 66 which extending through an elongated slot 67 in the trim brace 64. The bolt 66 extends into the panel 34 and the trim brace 64 may be pivoted along the slot 67 to a selected angle.

Figure 9:
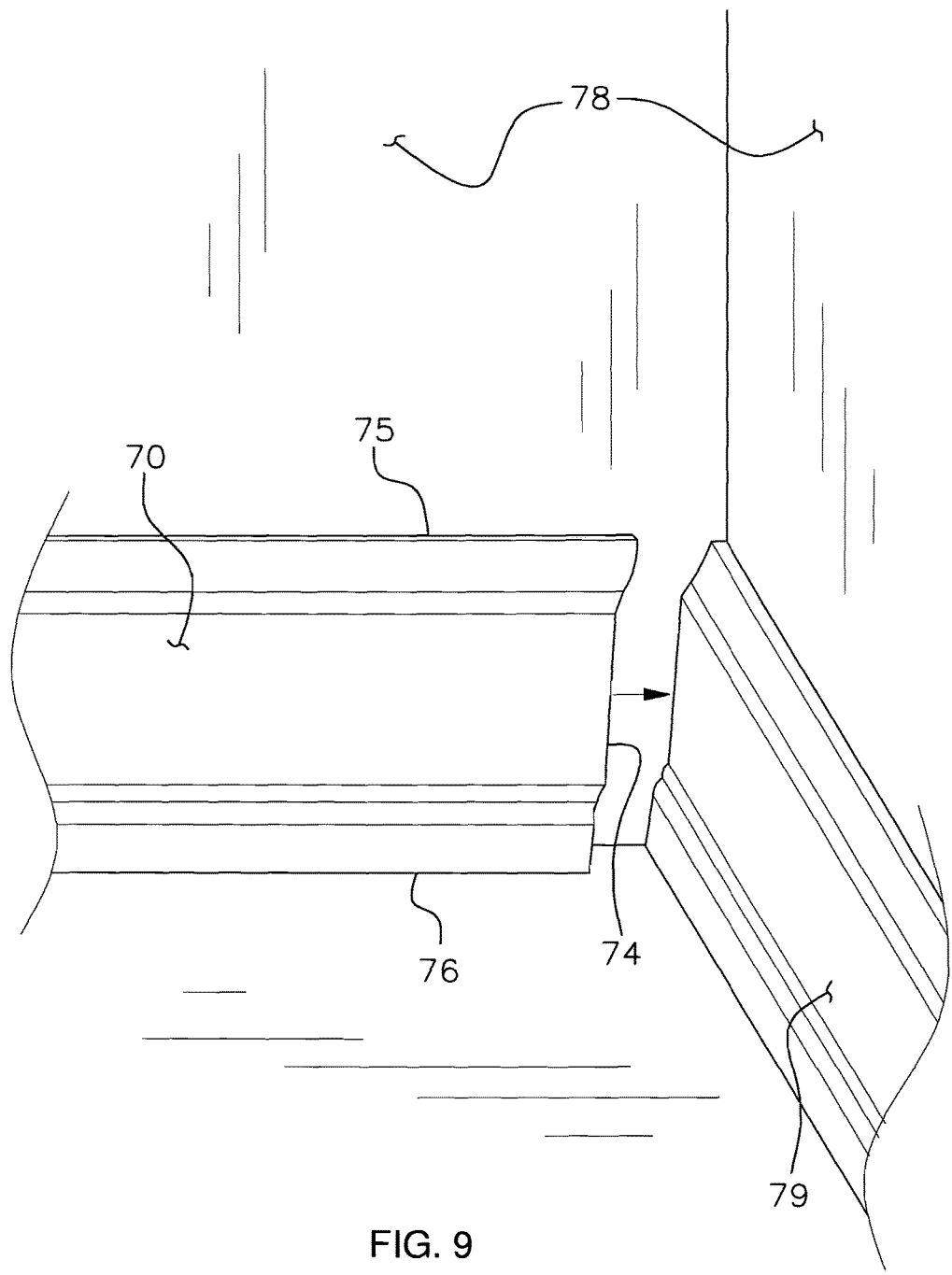
FIG. 9 is a perspective view of an embodiment of the disclosure depicting coped trimming.

With respect to the trim coping apparatus, the guide trim 71 is placed on the plate 51 as described above and the rod 61 is adjusted to ensure that it will follow all edges of the contouring 72. It should be understood that the guide trim 71 and wall trim 70 will be cut from like pieces of trim having the same contours. The plate 51 may be adjusted as needed to a proper angle. The wall trim 70 is clamped into place with the clamp 63 and adjusted so that a sufficient enough portion of the wall trim 70 will be cut to account for the depth of the deepest contours. The cutting assembly 20 is turned on and the wall trim 70 is moved into the saw blade 21 so that the saw blade 21 cuts the wall trim 70 from its upper edge 75 to its lower edge 76 (or vice versa). The movements of a free end 74 of the wall trim 70, or the end that is being removed, will be along a line orientated parallel to the axis of rotation of the saw blade 21. In this manner, it will be the teeth 27 on the opposed faces 28, 29 which cut the wall trim 70. The wall trim 70 is also moved toward or away from the saw blade 21 in response to the rod 61 moving along the contouring 72. The free end 74 of the wall trim 70 will be coped so that it can then be abutted against another piece of trim, as shown in FIG. 9, already mounted on a wall 78 with the free end 74 matching the contouring 79 of the trim already mounted on the wall.

Figure 6:
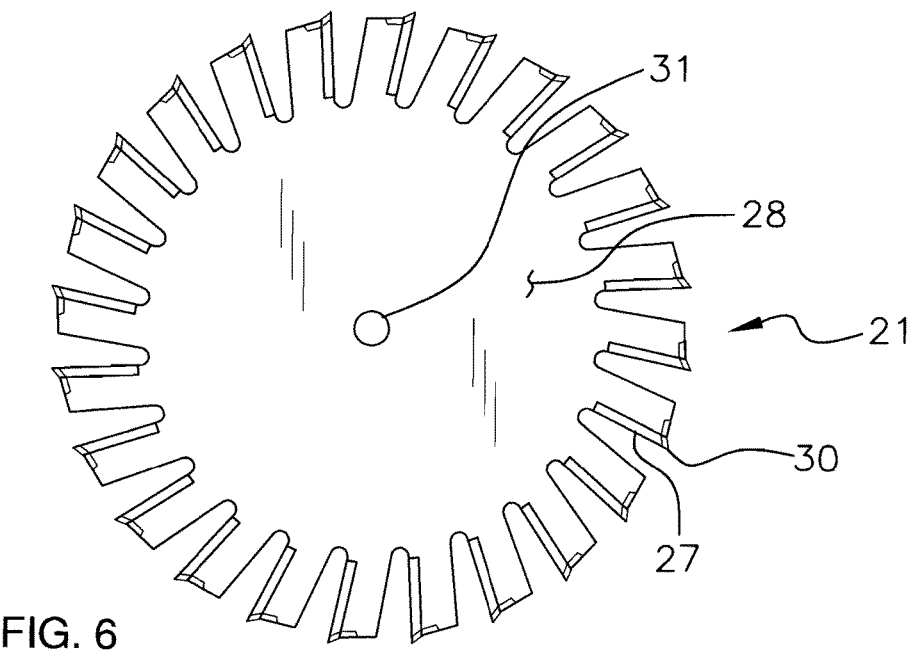
FIG. 6 is a side view of an embodiment of a saw blade of the disclosure.
Figure 7:
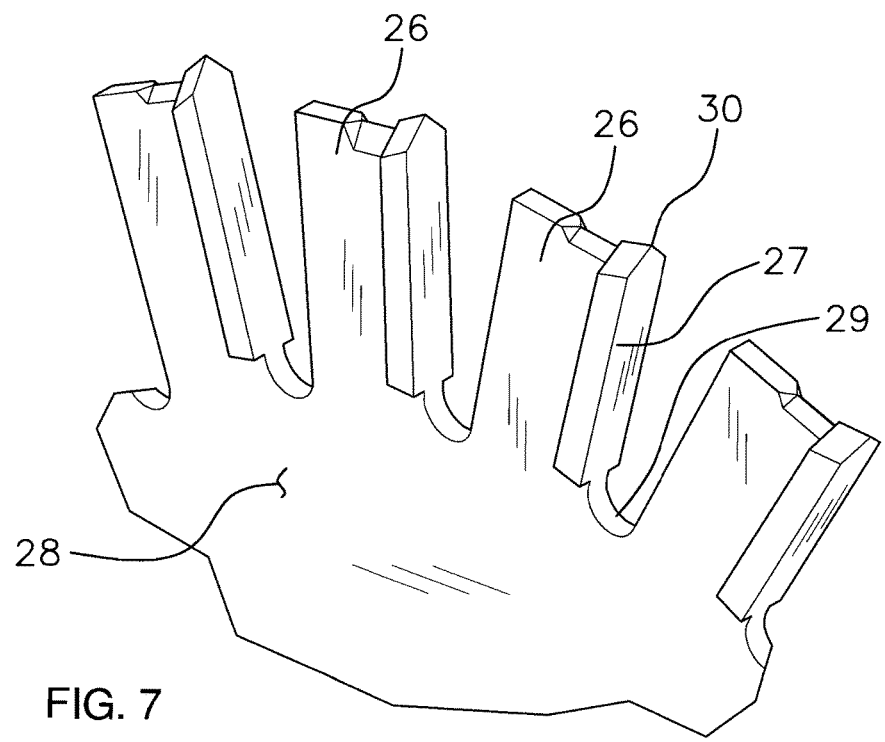
FIG. 7 is a partial perspective view of the saw blade of an embodiment of the disclosure.
Figure 8:
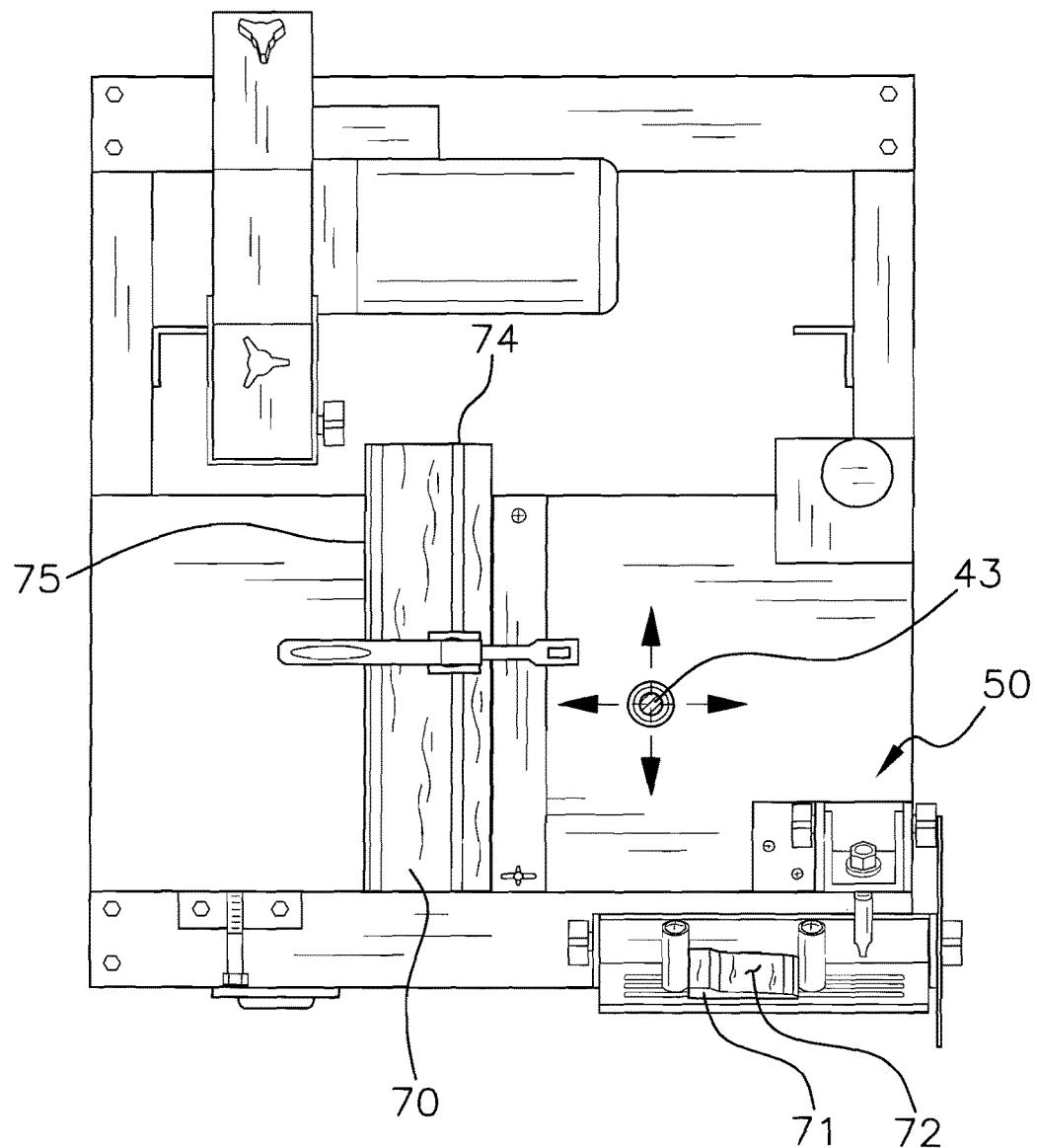
FIG. 8 is a top in-use view of an embodiment of the disclosure, having a portion of a handle removed for clarity.

As to FIGS. 6, 7 and 10, and more particular FIGS. 11-19, a laterally cutting saw blade assembly 110 is generally described which has particular usage with the coping apparatus 10. In particular, the blade assembly 110 includes a plate 112 that has a pair of opposed faces 114, 116 and a center 118, wherein the center 118 forms an aperture extending through the plate 112 to allow the plate 112 to be mounted to a cutting assembly 10, handsaw 150, or the like. The plate 112 has a peripheral edge 120 that has a plurality of shoulders 122 attached thereto and extending outwardly therefrom. Each of the shoulders 122 has a pair of opposed faces is corresponding with and being continuations of the opposed faces 114, 116 of the plate 112. The shoulders 122 may lie in the same plane as the plate 112 through they may be angled slightly out of plane as well depending on the usage of the blade assembly 110. Each of the shoulders 122 has a distal edge 124 with respect to the peripheral edge 120. The distal edge 124 of each of the shoulders 122 extends between a tailing edge 126 and a leading edge 128 of each of the shoulders 122.

Figure 15:
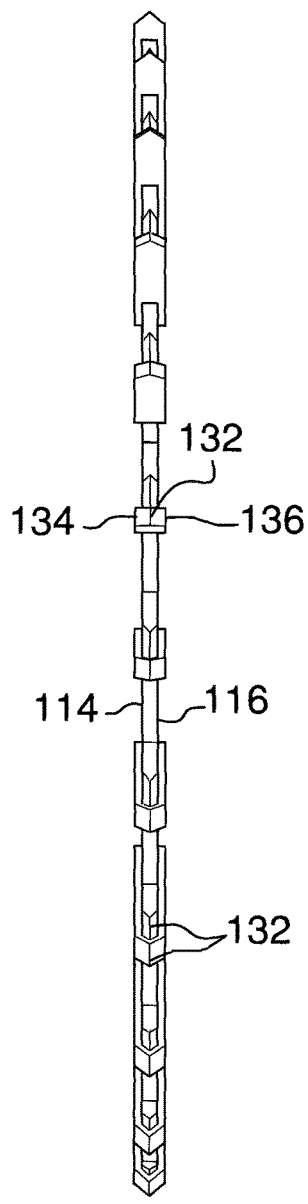
FIG. 15 is an end view of a saw blade assembly according to an embodiment of the disclosure.
Figure 16:
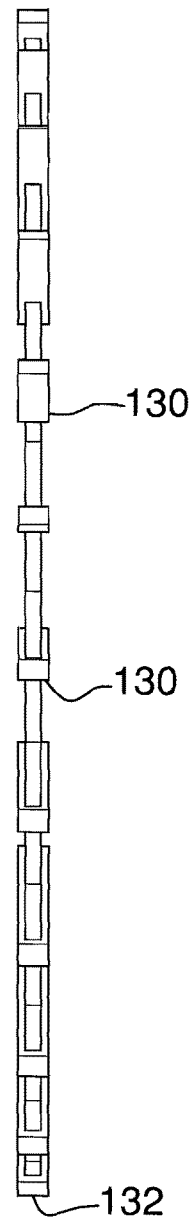
FIG. 16 is an end view of a saw blade assembly according to an embodiment of the disclosure.
Figure 17:
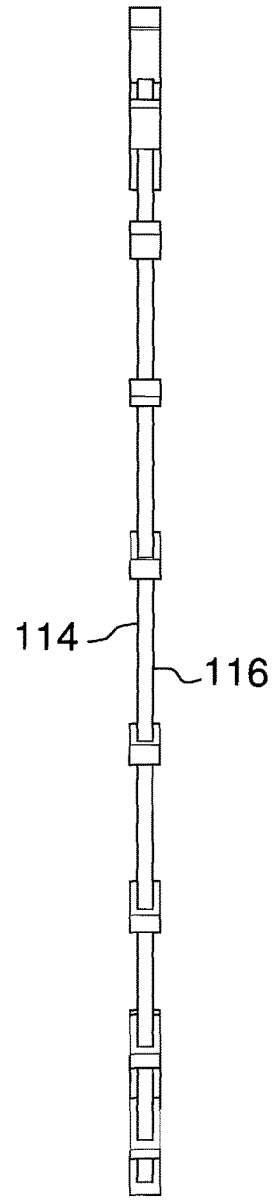
FIG. 17 is an end view of a saw blade assembly according to an embodiment of the disclosure.

A plurality of teeth 130 is provided. Each of the leading edges 128 has one of the teeth 130 attached thereto. As shown in FIGS. 15-17, the teeth 130 each extend laterally away from each of the opposed faces 114, 116 of the plate 112 a distance equal to at least 0.04 cm and may extend up to at least 0.1 cm. In other words, the teeth 130 from shoulders with the opposed faces 114, 116 wherein the shoulders each extend at least 0.04 cm outwardly from the opposed faces 114, 116. It has been found that shoulders extending away between 0.1 cm and 0.3175 cm may perform more advantageously for lateral cutting.

Figure 11:
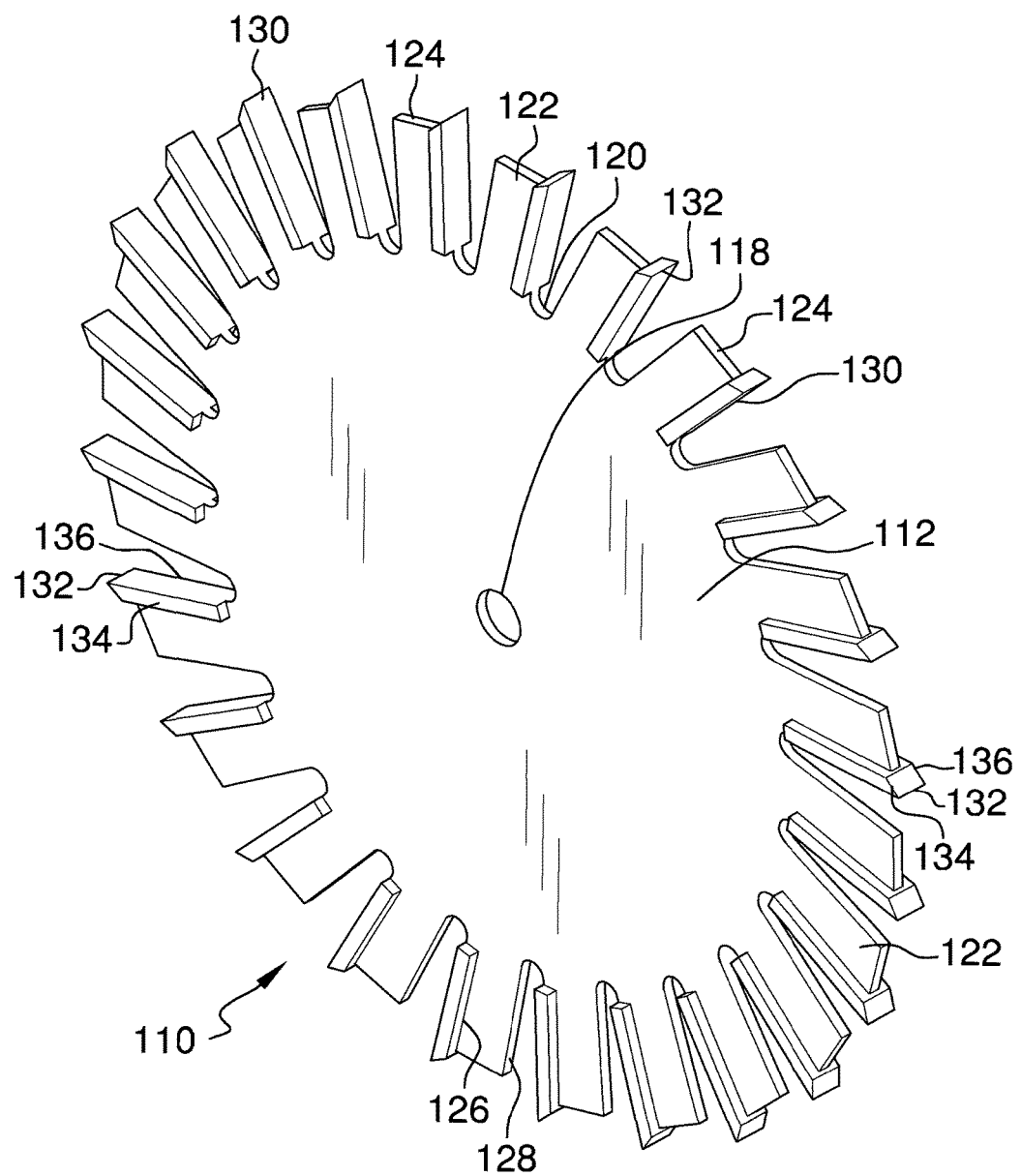
FIG. 11 is a front perspective view of a laterally cutting saw blade assembly according to an embodiment of the disclosure.
Figure 12:
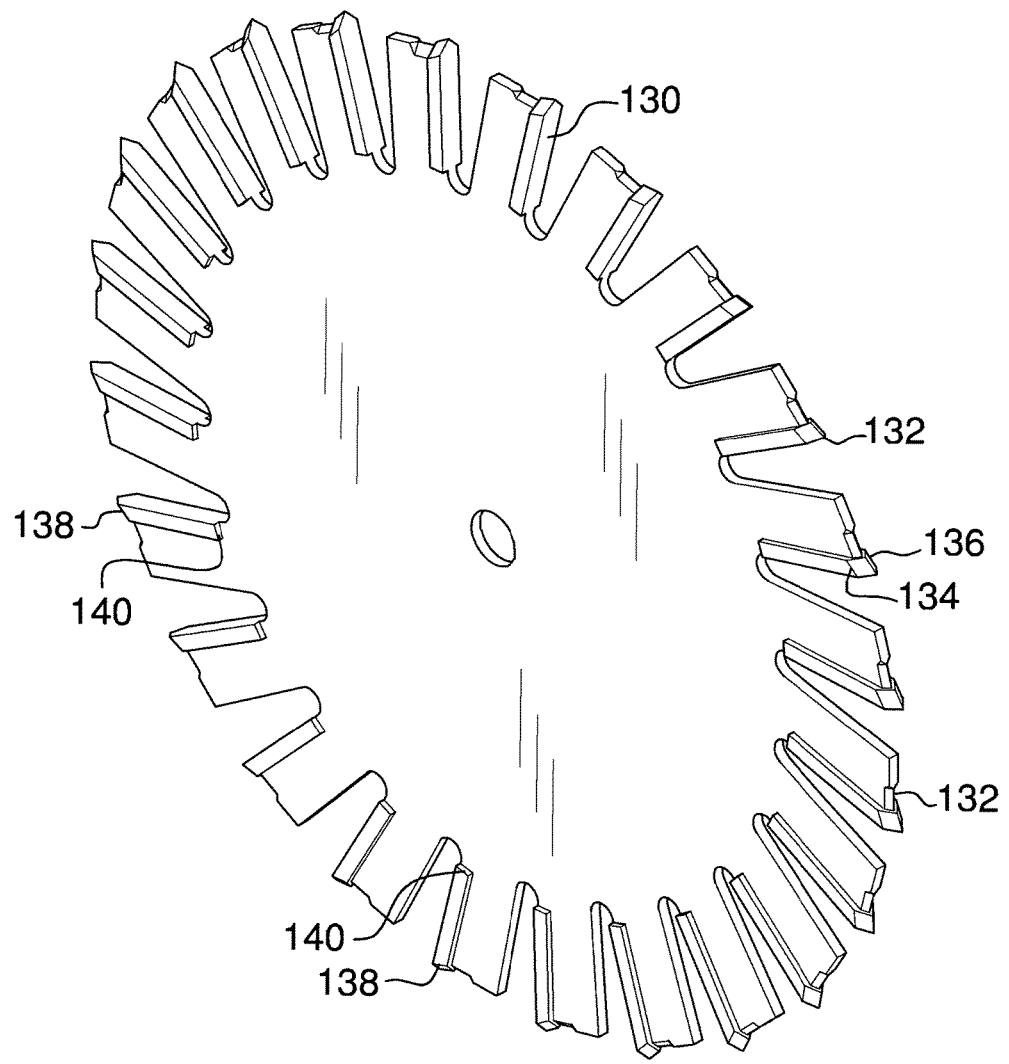
FIG. 12 is a front perspective view of a saw blade assembly according to an embodiment of the disclosure.
Figure 13:
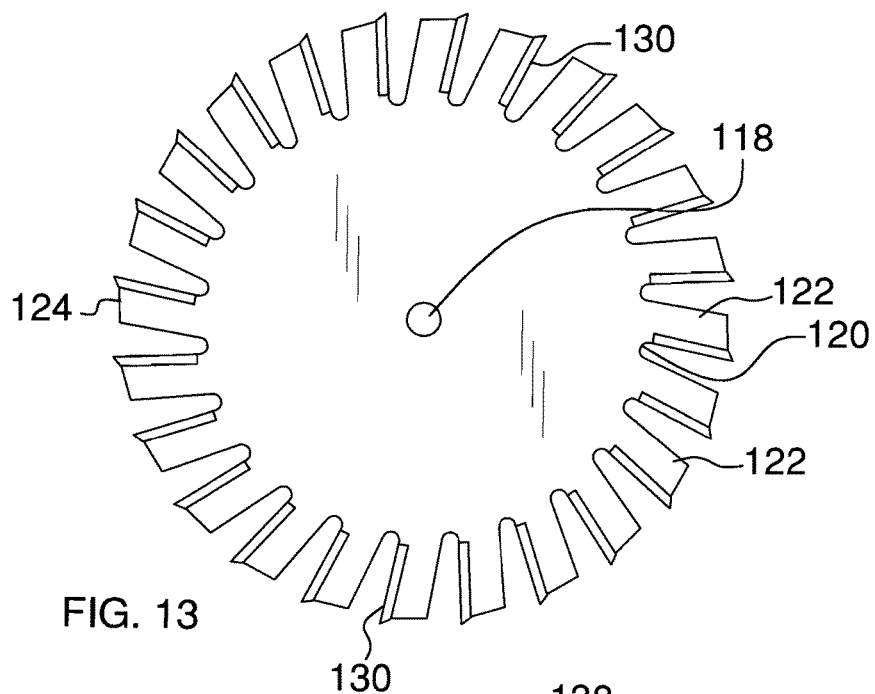
FIG. 13 is a side view of a saw blade assembly according to an embodiment of the disclosure.
Figure 14:
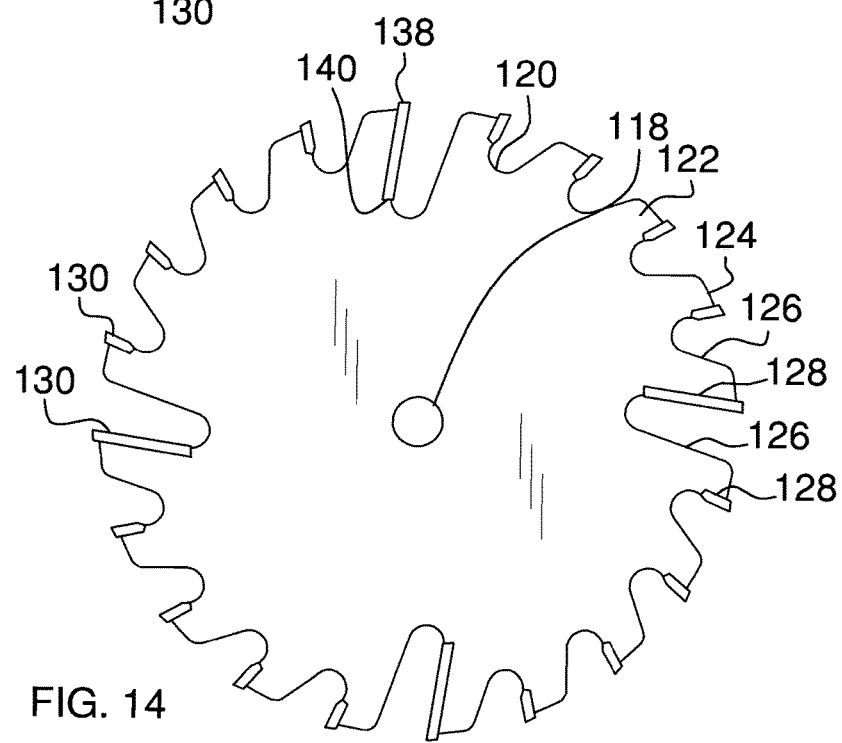
FIG. 14 is a side view of a saw blade assembly according to an embodiment of the disclosure.
Figure 18:
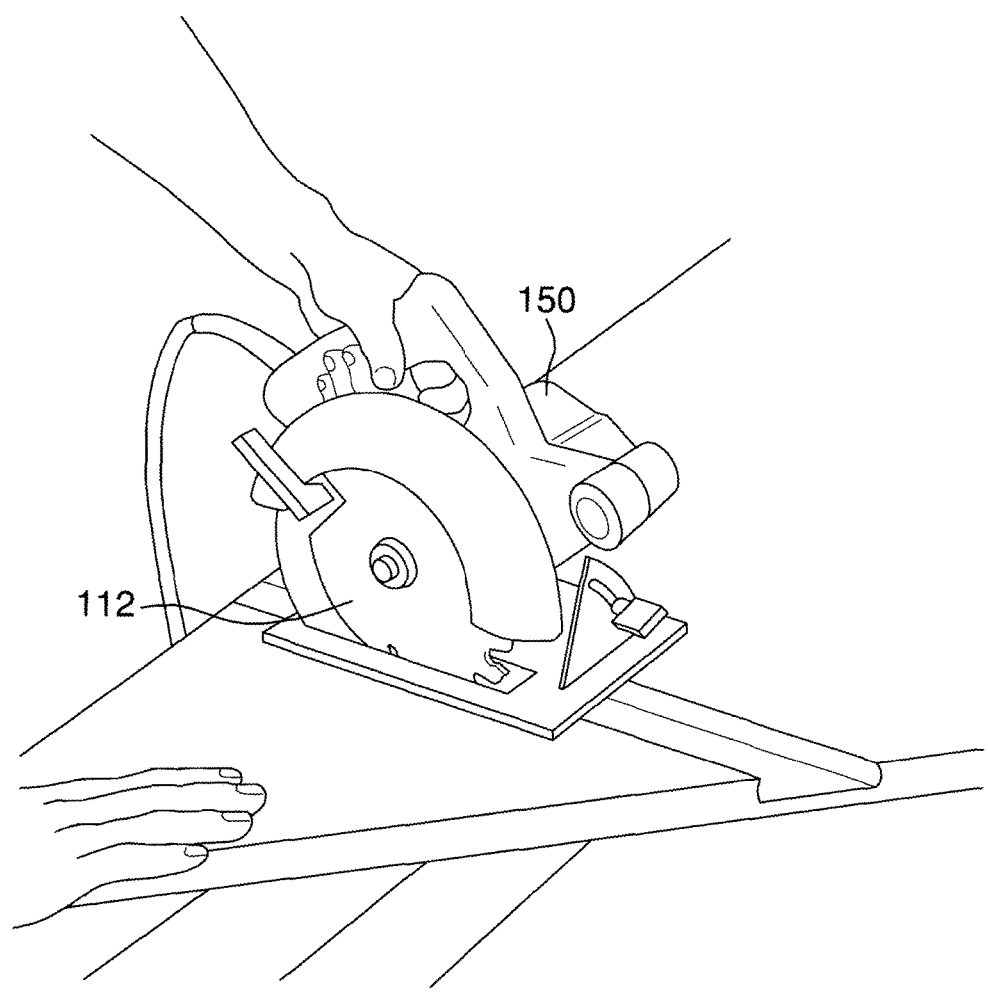
FIG. 18 is a perspective in-use view of a saw blade assembly according to an embodiment of the disclosure.
Figure 19:
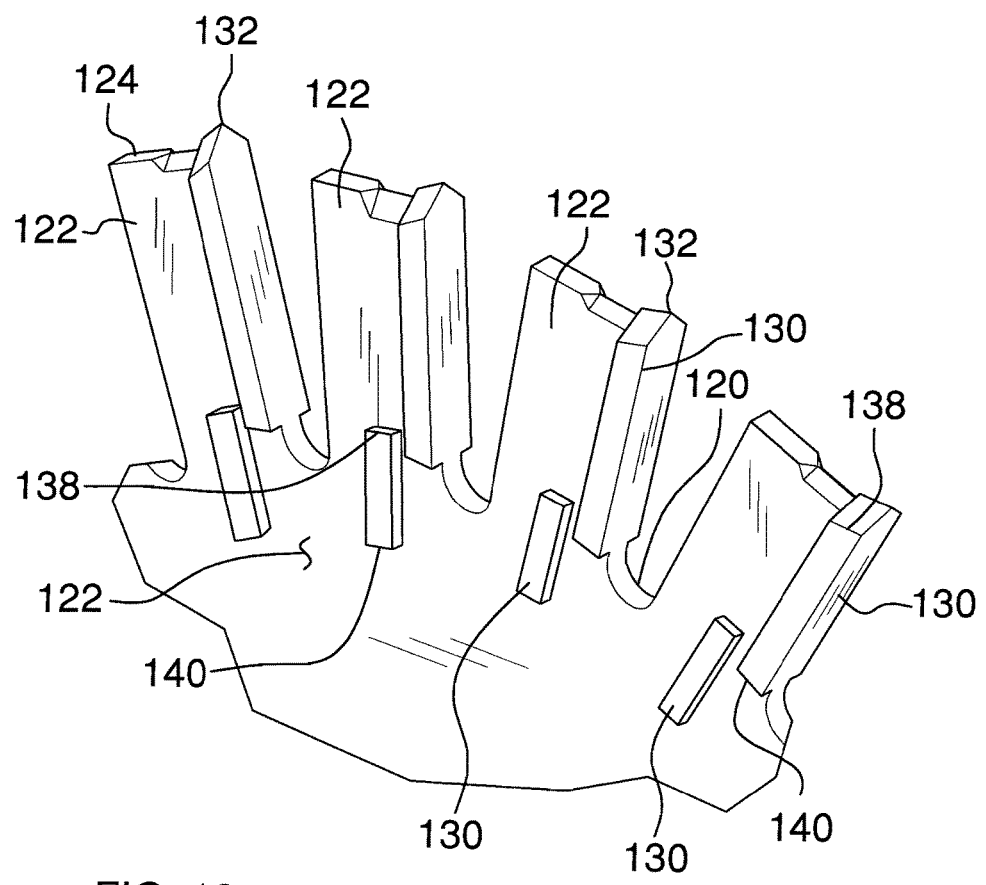
FIG. 19 is broken perspective view of a saw blade assembly according to an embodiment of the disclosure.
Figure 20:
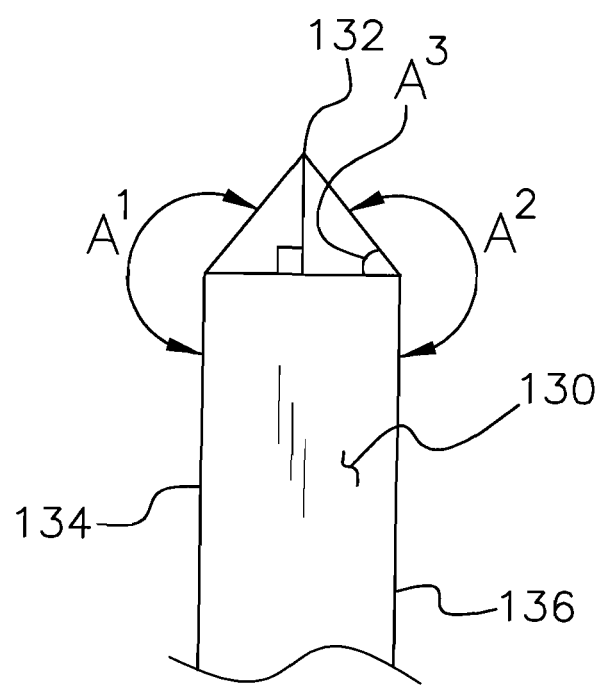
FIG. 20 is broken bottom view of a tooth according to an embodiment of the disclosure.

The teeth 130 form a plurality of cutting surfaces extending continuously from the distal edge 124 toward the center a distance, which may be equal to at least 1.25 cm, more preferably equal to at least 1.90 cm, and it has also been determined that the distance may be at least 2.50 cm or greater to allow for deeper lateral cutting. Though not necessarily ideal, the distance may be equal to or more than at least 3.81 cm to ensure thick pieces of trim may be properly cut. This may be accomplished in several manners. For instance, as shown in FIGS. 11 and 12, each of the teeth 130 has a length at least equal to 1.90 cm and may be greater than at least 2.50 cm. This type of saw blade assembly would typically be used for trim coping, though they could be used for cross-cuts as well. FIG. 14 shows only some teeth 130 having a required length, while also including shorter teeth 130. This type of saw blade assembly is more suited to ripping wood and can be used for framing purposes wherein a hand saw, as shown in FIG. 18, is allowed to move laterally in a piece of wood to form trough that can receive framing members. Also, teeth 130 may be mounted to the opposing sides 114, 116 away from the leading edges 126 as well as is shown in FIG. 19, so long as a combined length is equal to at least 1.90 cm, and may be greater than at least 2.50 cm, to ensure that a cut of that width can be made. This length has been shown to be more effective and efficient at making lateral cuts into wood and is much greater than the length of teeth on conventional saw blades.

At least some of the teeth 130 extend outwardly from the distal end 124 of the shoulder to define free edges 132. However, as shown in FIGS. 11-17, all teeth may include free edges 132. The free edges 132 extend between a first lateral edge 134 and a second lateral edge 136 of associated ones of the teeth 130 and typically extend at last 0.05 cm outwardly from the distal edge 124 and up to more than 0.20 cm. The greater distance may provide for better cutting of particularly arcuate trim. The free edges 132 may be tapered to a point such that angles $A^1$ and $A^2$, best shown in FIG. 20, formed at junctures of the first edge 134 and the free edge 132, and the second side edge 136 and the free edge 132, are each less than 225° and greater than 180°. This is also shown in FIGS. 7, 12 and 15. This forms angle $A^3$ which is greater than 45°. These angles $A^1$, $A^2$ may be less than 220° and it has been found that angles less than 220°, such as 210° and greater than 200°, will allow for more accurate cutting along curved surfaces, though it should be understood that such an angle may lead to premature dulling of the teeth and therefore would likely only be used for particular types of trims requiring a finer tooth. It has been found that the greater this angle, the more precise the blade assembly 110 will be when coping trim having arcuate and complex surfaces. As shown in FIG. 11, the free edge 132 may also be angled backward toward the distal edge 124.

Each of the teeth 130 has a forward end edge 138 and a rearward end edge 140 wherein the forward end edge 138 is positioned distal to the center 118 and the rearward end edge 140 is positioned proximal to the center 118. Each of the teeth 130 may have a decreasing width extending away from the blade 112 from the forward end edges 138 to a corresponding one of the rearward end edges to inhibit binding of the saw blade assembly 110. It should be understood also the saw blade assembly 10 may have any required diameter and will typically have conventional diameters between 10.0 cm and 28.0 cm.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A cutting system configured for laterally cutting a piece of wood, said system including:
a plate having a pair of opposed faces and a center forming an aperture extending through said plate, said plate having a peripheral edge having a plurality of shoulders attached thereto and extending outwardly therefrom, each of said shoulders having a pair of opposed faces being corresponding with and being continuations of said opposed faces of said plate, each of said shoulders having a distal edge with respect to said peripheral edge, said distal edge of each of said shoulders extending between a trailing edge and a leading edge of each of said shoulders;
a plurality of teeth being provided, each of said leading edges having one of said teeth attached thereto, each of said teeth extending laterally away from each of said opposed faces, said teeth forming a plurality of cutting surfaces extending continuously along a line from said distal edge toward said center a distance of at least 1.90 cm;
said plate and said teeth defining a saw blade assembly having an overall length being between 10.0 cm and 28.0 cm; and
a cutting assembly configured to receive said plate and a piece of material to be cut, said cutting assembly rotating said plate along an axis of rotation oriented perpendicular to said opposed faces, said cutting assembly being configured to allow movement of said plate and the material with respect to each other laterally along said axis of rotation, said teeth being configured to cut the material laterally to said opposed faces as said plate and the material are moved with respect to each other along said axis of rotation, said cutting assembly including a panel configured for having the material removably secured thereto, wherein said panel and the material are both laterally moveable together with respect to the plate.

2. The system according to claim 1, wherein at least some of said teeth extends outwardly from distal end of said shoulder to define free edges, said free edges extending between a first lateral edge and a second lateral edge of associated ones of said teeth.

3. The system according to claim 2, wherein said free edges are tapered to a point such that angles formed between each of said first and second lateral edges and said free edge is less than 225°.

4. The system according to claim 1, wherein each of said teeth has a forward end edge and a rearward end edge wherein said forward end edge is positioned distal to said center and said rearward end edge is positioned proximal to said center, each of said teeth having a decreasing width extending away from said blade from said forward end edges to a corresponding one of said rearward end edges to inhibit binding of said plate.

5. The system according to claim 1, wherein each of said teeth extends outwardly from said distal end of said shoulder to define free edges, said free edges extending between a first lateral edge and a second lateral edge of associated ones of said teeth, each of said teeth having said free edge and a rearward end edge wherein said free edge is positioned distal to said center and said rearward end edge is positioned proximal to said center.

6. The system according to claim 5, wherein each of said teeth has a length from associated ones of said rearward and free edges being at least 2.50 cm.

7. The system according to claim 5, wherein each of said free edges is tapered to a point such that an angle formed between each of said first and second lateral edges and said free edge is less than 225°.

8. The system according to claim 1, wherein said teeth extend laterally away from each of said opposed faces a distance between 0.1 cm and 0.3175 cm.

9. A cutting system configured for laterally cutting a piece of wood, said system including:
a plate having a pair of opposed faces and a center forming an aperture extending through said plate, said plate having a peripheral edge having a plurality of shoulders attached thereto and extending outwardly therefrom, each of said shoulders having a pair of opposed faces being corresponding with and being continuations of said opposed faces of said plate, each of said shoulders having a distal edge with respect to said peripheral edge, said distal edge of each of said shoulders extending between a trailing edge and a leading edge of each of said shoulders;
a plurality of teeth being provided, each of said leading edges having one of said teeth attached thereto, each of said teeth extending laterally away from each of said opposed faces, said teeth forming a plurality of cutting surfaces extending continuously from said distal edge toward said center a distance of at least 2.50 cm, at least some of said teeth extending outwardly from said distal end of said shoulder to define free edges, said free edges extending between a first lateral edge and a second lateral edge of associated ones of said teeth, said free edges being tapered to a point such that an angle formed between each of said first and second lateral edges and said free edge is less than 225° and greater than 200°;
said plate and said teeth defining a saw blade assembly having an overall length being between 10.0 cm and 28.0 cm;
each of said teeth having a rearward end edge wherein said free edge is positioned distal to said center and said rearward end edge is positioned proximal to said center, each of said teeth having a decreasing width extending away from said blade from said free edges to a corresponding one of said rearward end edges to inhibit binding of said plate; and
a cutting assembly configured to receive said plate and a piece of material to be cut, said cutting assembly rotating said plate along an axis of rotation oriented perpendicular to said opposed faces, said cutting assembly being configured to allow movement of said plate and the material with respect to each other laterally along said axis of rotation, said teeth being configured to cut the material laterally to said opposed faces as said plate and the material are moved with respect to each other along said axis of rotation, said cutting assembly including a panel configured for having the material removably secured thereto, wherein said panel and the material are both laterally moveable together with respect to the plate.

10. The system according to claim 9, wherein each of said teeth has a length from associated ones of said rearward and free edges being at least 2.50 cm.

11. The system according to claim 9, wherein each of said teeth has a length from associated ones of said rearward and free edges being at least 3.81 cm.

12. The system according to claim 9, wherein said teeth extend laterally away from each of said opposed faces a distance between 0.1 cm and 0.3175 cm.

* * * * *